US008842105B2

(12) United States Patent
Yang

(10) Patent No.: US 8,842,105 B2
(45) Date of Patent: Sep. 23, 2014

(54) CONTROLLER DRIVER FOR DRIVING DISPLAY PANEL

(75) Inventor: Hsing-Chien Yang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 267 days.

(21) Appl. No.: 13/226,500

(22) Filed: Sep. 7, 2011

(65) Prior Publication Data

US 2012/0262436 A1 Oct. 18, 2012

Related U.S. Application Data

(60) Provisional application No. 61/475,255, filed on Apr. 14, 2011.

(30) Foreign Application Priority Data

Jun. 1, 2011 (TW) ............................ 100119242 A

(51) Int. Cl.
*G06F 3/038* (2013.01)
*G09G 3/20* (2006.01)
*G09G 3/00* (2006.01)

(52) U.S. Cl.
CPC .............. *G09G 3/006* (2013.01); *G09G 3/2096* (2013.01); *G09G 2370/08* (2013.01)
USPC ............................................ 345/204; 345/98

(58) Field of Classification Search
CPC .. G09G 2370/08; G09G 3/006; G09G 3/2096
USPC .................................................... 345/98, 204
See application file for complete search history.

(56) References Cited

U.S. PATENT DOCUMENTS

| | | | | |
|---|---|---|---|---|
| 2007/0115021 | A1* | 5/2007 | Tomita | 324/770 |
| 2007/0236243 | A1* | 10/2007 | Park et al. | 324/770 |
| 2008/0129895 | A1* | 6/2008 | Jikumaru | 348/790 |

(Continued)

FOREIGN PATENT DOCUMENTS

| | | |
|---|---|---|
| CN | 101236722 | 8/2008 |
| JP | 2008083589 | 4/2008 |

(Continued)

OTHER PUBLICATIONS

"Office Action of Taiwan Counterpart Application", issued on Sep. 12, 2013, p. 1-p. 9.

(Continued)

*Primary Examiner* — Viet Pham
(74) *Attorney, Agent, or Firm* — Jianq Chyun IP Office

(57) ABSTRACT

A controller driver for driving a display panel is provided. The controller driver comprises a timing control circuit, a data memory unit, a data selection unit and a data line driver circuit. The data memory unit stores image data. The data selection unit coupled to the data memory unit outputs the image data provided from the data memory unit as a display data, or generates the display data in accordance with a command or test patterns provided from an external processor. The data line driver circuit is coupled to the timing control circuit and the data selection unit. The data line driver circuit receives the display data from the data selection unit, and outputs corresponding grayscale voltages according to the control signal outputted from the timing control circuit.

8 Claims, 10 Drawing Sheets

(56) References Cited

U.S. PATENT DOCUMENTS

| | | | | |
|---|---|---|---|---|
| 2008/0252567 | A1 * | 10/2008 | Kawabe | 345/76 |
| 2010/0091009 | A1 * | 4/2010 | Uchiyama | 345/214 |
| 2011/0109536 | A1 * | 5/2011 | Huang et al. | 345/99 |
| 2012/0098975 | A1 * | 4/2012 | Chao et al. | 348/187 |

FOREIGN PATENT DOCUMENTS

| | | |
|---|---|---|
| KR | 20070118459 | 12/2007 |
| TW | 367071 | 8/1999 |
| TW | 200609878 | 3/2006 |
| TW | 200617838 | 6/2006 |
| TW | 200620192 | 6/2006 |
| TW | 200717403 | 5/2007 |

OTHER PUBLICATIONS

"Office Action of China Counterpart Application", issued on May 16, 2014, p. 1-p. 8.

* cited by examiner

CONTROLLER DRIVER FOR DRIVING DISPLAY PANEL

CROSS-REFERENCE TO RELATED APPLICATION

This application claims the priority benefits of U.S. provisional application Ser. No. 61/475,255, filed on Apr. 14, 2011 and Taiwan application serial no. 100119242, filed on Jun. 1, 2011. The entirety of each of the above-mentioned patent applications is hereby incorporated by reference herein and made a part of this specification.

BACKGROUND OF THE INVENTION

1. Field of the Invention

The invention relates to a display device. Particularly, the invention relates to a controller driver for driving a display panel.

2. Description of Related Art

Referring to FIG. 1, FIG. 1 is a block schematic diagram of a conventional controller driver 120 of a display panel 140. The controller driver 120 includes a system interface circuit 122, a memory control circuit 124, an image data memory 126, a timing control circuit 128, a data line driving circuit 132, a scan line driving circuit 134 and a grayscale voltage generating circuit 136. The system interface circuit 122 is coupled to an external processor 110, and the data line driving circuit 132 and the scan line driving circuit 134 are coupled to the display panel 140.

When the controller driver 120 is operated in a normal operation mode, the processor 110 transmits display data to the memory control circuit 124 through the system interface circuit 122. The memory control circuit 124 temporarily stores the display data in the image data memory 126. The processor 110 transmits a control signal to the timing control circuit 128 through the system interface circuit 122. The timing control circuit 128 sends corresponding control signals to the memory control circuit 124, the data line driving circuit 132 and the scan line driving circuit 134 in timing. For example, the timing control circuit 128 reads image data corresponding to a same scan line in an image frame from the image data memory 126 through the memory control circuit 124, and latches the image data to data output terminals of the memory control circuit 124. After the memory control circuit 124 completes reading the image data, the timing control circuit 128 further controls the data line driving circuit 132 and the scan line driving circuit 134 to transmit the image data latched to the data output terminals of the memory control circuit 124 to pixels of the corresponding scan line in the display panel 140. Deduced by analogy, the controller driver 120 transmits image data corresponding to other scan lines in the image frame to the pixels of the corresponding scan lines in the display panel 140, so as to display a corresponding image.

FIG. 2A is a timing diagram of the controller driver 120 of FIG. 1 in the normal operation mode. Here, it is assumed that the scan line driving circuit 134 includes a plurality of output terminals respectively driving a first scan line G1, a second scan line G2, a third scan line G3, an $N^{th}$ scan line GN and other scan lines of the display panel 140. A gate address GA varied every a predetermined time is transmitted from the timing control circuit 128. The scan line driving circuit 134 sequentially drives the scan lines of the display panel 140 according to the gate address GA. As shown in an upper part of FIG. 2A, a fixed time, i.e. a frame time is divided into N gate driving periods T. Under control of the timing control circuit 128, the scan line driving circuit 134 sequentially drives one of the scan lines of the display panel 140 at different gate driving periods T.

A lower part of FIG. 2A includes (1) display data of a data line driver in the data line driving circuit 132; (2) latch signals used to control the data output terminals of the memory control circuit 124 that are transmitted from the timing control circuit 128; (3) reading pulses used to control the image data memory 126 through the memory control circuit 124 that are transmitted from the timing control circuit 128.

When the controller driver 120 is operated in a test operation mode, the external processor 110 writes a test pattern into the image data memory 126 through the system interface circuit 122 and the memory control circuit 124 in advance. After the test pattern is written into the image data memory 126, the timing control circuit 128 reads the test pattern from the image data memory 126 through the memory control circuit 124 in timing, and transmits the test pattern to the data line driving circuit 132. The timing control circuit 128 further controls the data line driving circuit 132 to output the test pattern. An external test equipment is used to measure the output of the data line driving circuit 132 to determine whether the controller driver 120 passes the test.

Referring to FIG. 2B, FIG. 2B is a test flow of the controller driver 120 of FIG. 1 in the test operation mode. First, in step S205, the external processor 110 (for example, a test platform) activates the controller driver 120, and the controller driver 120 enters the test operation mode in response to a control signal TE provided from the external processor 110. In step S210, the external process 110 (for example, the test platform) writes the test pattern into the image data memory 126 through a writing path, i.e. through the system interface circuit 122 and the memory control circuit 124. Then, in step S220, the test pattern is read from the image data memory 126 through a reading path, namely, the memory control circuit 124 reads the test pattern from the image data memory 126 to the data line driving circuit 132. The timing control circuit 128 further control the data line driving circuit 132 for outputting the test pattern. Then, in step S230, by measuring the output of the data line driving circuit 132, it is determined whether the controller driver 120 passes the test. If the controller driver 120 does not pass the test, in step S250, the test flow is ended, and if the controller driver 120 passes the test, in step S240, it is determined whether a last test pattern is tested, and if yes, the step S250 is executed to end the test flow. If the current test pattern is not the last test pattern, the step S210 is returned, and the external processor 110 writes a next test pattern to the image data memory 126 to perform a next test procedure, i.e. the steps S210-S250 are repeated.

In the test flow, a display timing diagram of the controller driver 120 is shown in FIG. 3. The display timing diagram includes (1) image data memory read enable signals of the memory control circuit 124; (2) row addresses; (3) outputs of the image data memory 126; (4) latches enable signals of the data output terminals of the memory control circuit 124; (5) data line driving enable signals of the data line driving circuit 132; and (6) data line outputs of the data line driving circuit 132.

When the memory control circuit 124 receives pulses of the row address and the image data memory read enable signal sent by the timing control circuit 128, it completes reading data from the image data memory 126 within a predetermined time. For example, as shown in FIG. 3, after the memory control circuit 124 receives a pulse of the image data memory read enable signal, it reads the image data memory 126 according to the row address within a time section $T_R$, and reads the corresponding display data from the image data memory 126 after the time section $T_R$, for example, $N^{th}$ row display data of FIG. 3. During the time section $T_R$, the data line driving enable signal outputs to the data line driving circuit 132 by the timing control circuit 128 is in a logic high state, and the data line driving circuit 132 outputs $(N-1)^{th}$ row display data.

After the time section $T_R$, the memory control circuit 124 completes the read operation of the $N^{th}$ row display data, and now the timing control circuit 128 transmits a latch enable signal to the memory control circuit 124. After the memory control circuit 124 receives the pulse of the latch enable signal, it latches the $N^{th}$ row display data to the data output terminals of the memory control circuit 124, and provides the $N^{th}$ row display data to the data line driving circuit 132. Therefore, the data line driving circuit 132 can provide the $N^{th}$ row display data to the data lines of the display panel 140 when the data line driving enable signal outputted by the timing control circuit 128 is in the logic high state. Deduced by analogy, the memory control circuit 124 sequentially outputs the $(N+1)^{th}$ display data to the $(N+n-1)^{th}$ display data according to the pulses of the image data memory read enable signal.

Regarding the conventional controller driver 120, both of the normal operation mode and the test operation mode, a same transmission channel is used to transmit the display data and the test pattern. Based on the above architecture, when the test operation is performed on the controller driver 120, interface transmission efficiency and a limiting condition of the transmission channel have to be considered, and the probably generated delays may greatly increase a testing time and reduce a testing efficiency.

For example, regarding a controller driver IC used in a mobile phone, the testing time is relatively long, and a waiting time is required during data testing, where the waiting time includes a. a time for writing test data into a static random access memory (SRAM, which is equivalent to the image data memory 126); b. a time for sending the test data from the SRAM to a source driver (which is equivalent to the data line driving circuit 132). The above two operations are all related to a SRAM accessing speed.

SUMMARY OF THE INVENTION

The invention is directed to a controller driver, which has improved test efficiency.

The invention provides a controller driver including a timing control circuit, a data memory unit, a data selection unit and a data line driving circuit. The timing control circuit outputs control signals. The data memory unit stores image data. The data selection unit is coupled to the data memory unit. The data selection unit selects to output the image data provided by the data memory unit as display data, or generates the display data according to a command or a test pattern provided from an external processor. The data line driving circuit is coupled to the timing control circuit and the data selection unit. The data line driving circuit receives the display data from the data selection unit, and outputs a corresponding grayscale voltage according to the control signal.

In an embodiment of the invention, when the controller driver is operated in a normal operation mode, the data selection unit directly transmits the image data outputted by the data memory unit to the data line driving circuit to serve as the display data. When the controller driver is operated in a test operation mode, the data selection unit generates the display data to the data line driving circuit according to the command or the test pattern provided by the external processor.

In an embodiment of the invention, when the controller driver is operated in the test operation mode, the data selection unit provides the test pattern outputted by the external processor to the data line driving circuit to serve as the display data.

In an embodiment of the invention, when the controller driver is operated in the test operation mode, the data selection unit generates a corresponding test pattern to the data line driving circuit to serve as the display data according to the command outputted by the external processor.

In an embodiment of the invention, when the controller driver is operated in the test operation mode, the data selection unit decodes the command and selectively provides the test pattern to a part of or all of channels of the data line driving circuit to serve as the display data according to a decoding result.

In an embodiment of the invention, the data selection unit includes a plurality of logic units. An output terminal of each of the logic units is connected to one of a plurality of output stage circuits of the data line driving circuit. The logic units select to output the image data provided by the data memory unit to the output stage circuits, or generate the display data to the output stage circuits according to the command or the test pattern provided by the external processor.

In an embodiment of the invention, the controller driver further includes a system interface circuit. The system interface circuit is coupled to the data memory unit, the data selection unit and the timing control circuit. The external processor transmits the command or the test pattern to the data selection unit through the system interface circuit.

In an embodiment of the invention, the data memory unit includes an image data memory and a memory control circuit. The image data memory stores the image data. The memory control circuit is coupled between the image data memory and the data selection unit.

According to the above descriptions, the data selection unit of the invention can select to output the image data provided by the data memory unit to serve as the display data. Alternatively, the data selection unit can select to generate the display data according to the command or the test pattern provided by the external processor. Therefore, the controller driver is unnecessary to write the test pattern into the data memory unit, and unnecessary to read the test pattern from the data memory unit, so that the test efficiency of the controller driver is ameliorated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 4:
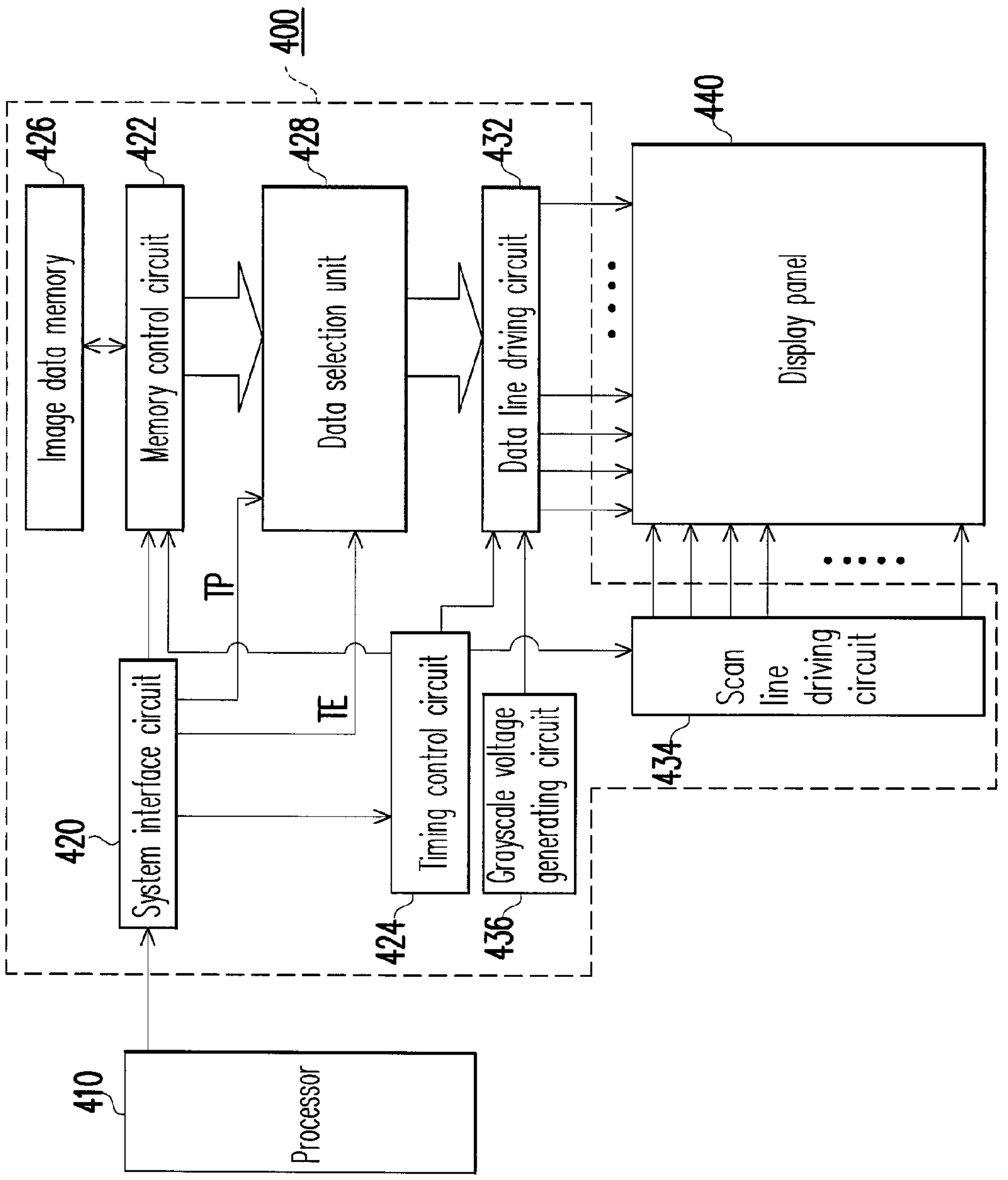
FIG. 4 is a functional block schematic diagram of a controller driver according to an embodiment of the invention.

FIG. 4 is a block schematic diagram of a display according to an embodiment of the invention. Referring to FIG. 4, a controller driver 400 includes at least a system interface circuit 420, a data memory unit, a timing control circuit 424, a data selection unit 428, a data line driving circuit 432, a scan line driving circuit 434 and a grayscale voltage generating circuit 436. The data memory unit includes a memory control circuit 422 and an image data memory 426. The system interface circuit 420 is coupled to an external processor 410 (or a test platform), and the data line driving circuit 432 and the scan line driving circuit 434 are coupled to the display panel 440 (or a test platform).

Figure 7:
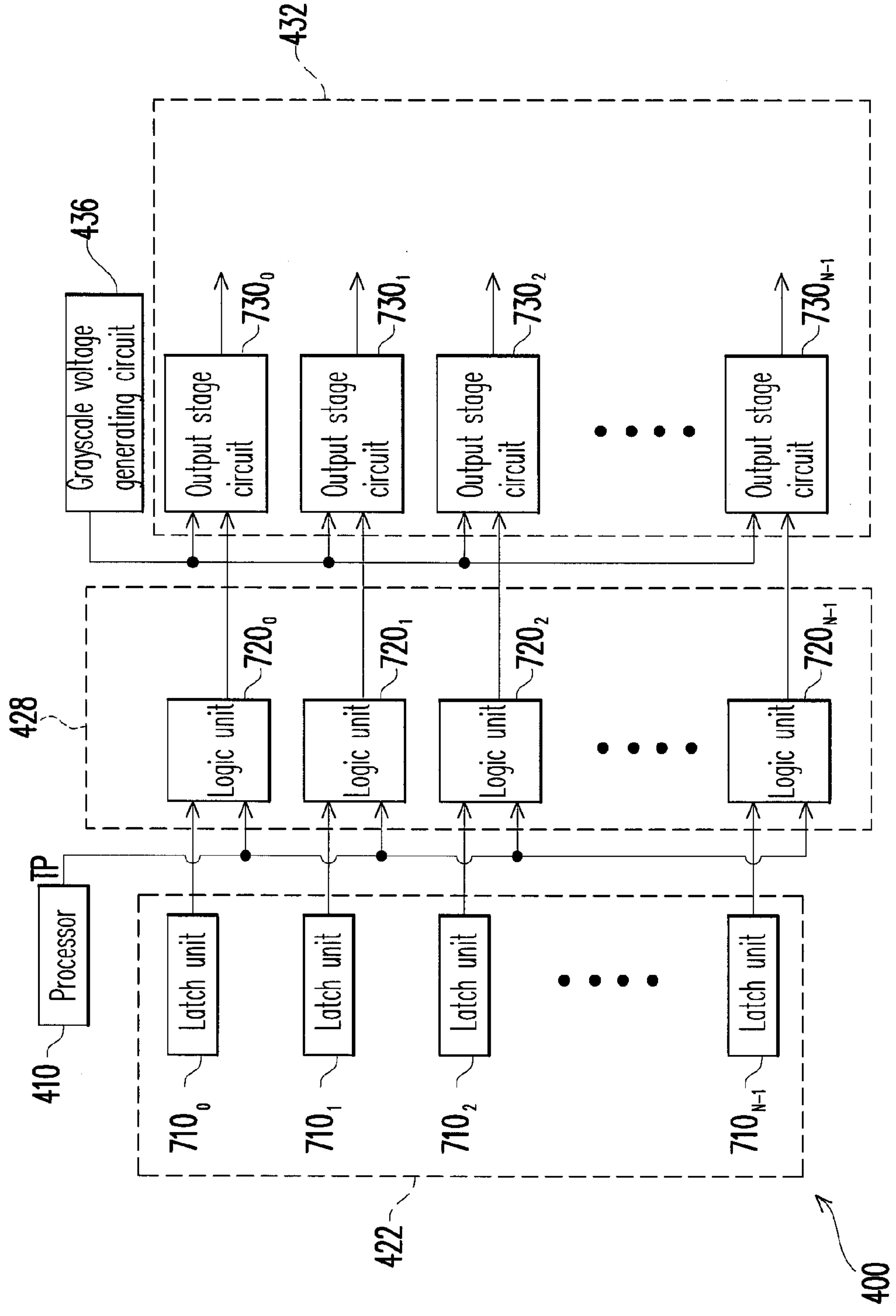
FIG. 7 is a partial circuit block diagram of a controller driver according to another embodiment of the invention.

In the embodiment of FIG. 4, the data selection unit 428 is disposed between the memory control circuit 422 and the data line driving circuit 432. The data selection unit 428 of FIG. 4 can be a decoding circuit, a multiplexer, a logic circuit or other circuits, for example, FIG. 7 illustrates an implementation of the data selection unit 428, which is described later.

Referring to FIG. 4, the processor 410 is electrically connected to the memory control circuit 422, the data selection unit 428 and the timing control circuit 424 through the system interface circuit 420 to transmit commands, control signals and image data. The system interface circuit 420 is used for transmitting the commands and the control signals or coupling a data bus.

Figure 1:
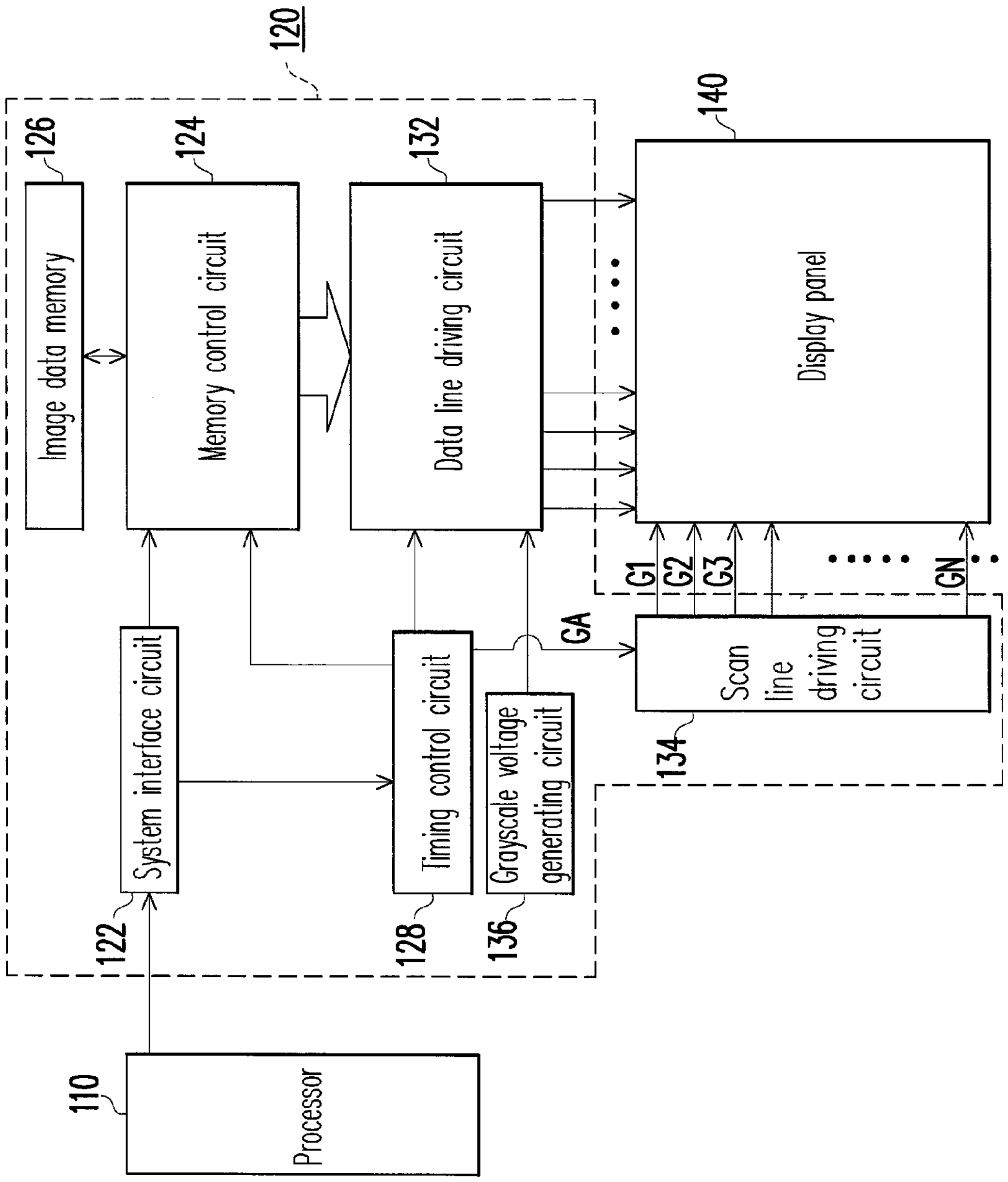
FIG. 1 (RELATED ART)
FIG. 1 is a functional block schematic diagram of a conventional controller driver of a display panel.
Figure 2A:
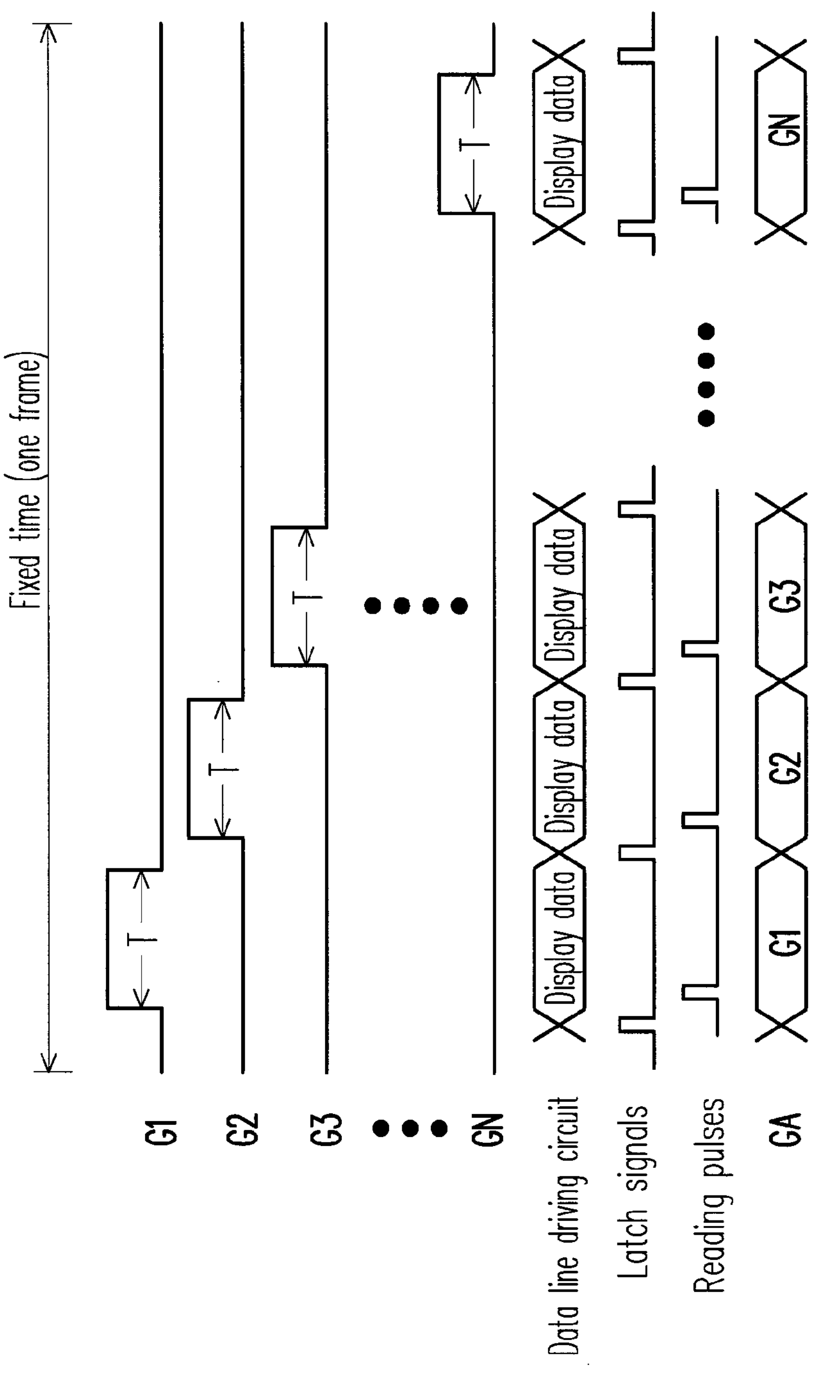
FIG. 2A(RELATED ART)
FIG. 2A is a timing diagram of the controller driver of FIG. 1 in a normal operation mode.
Figure 2B:
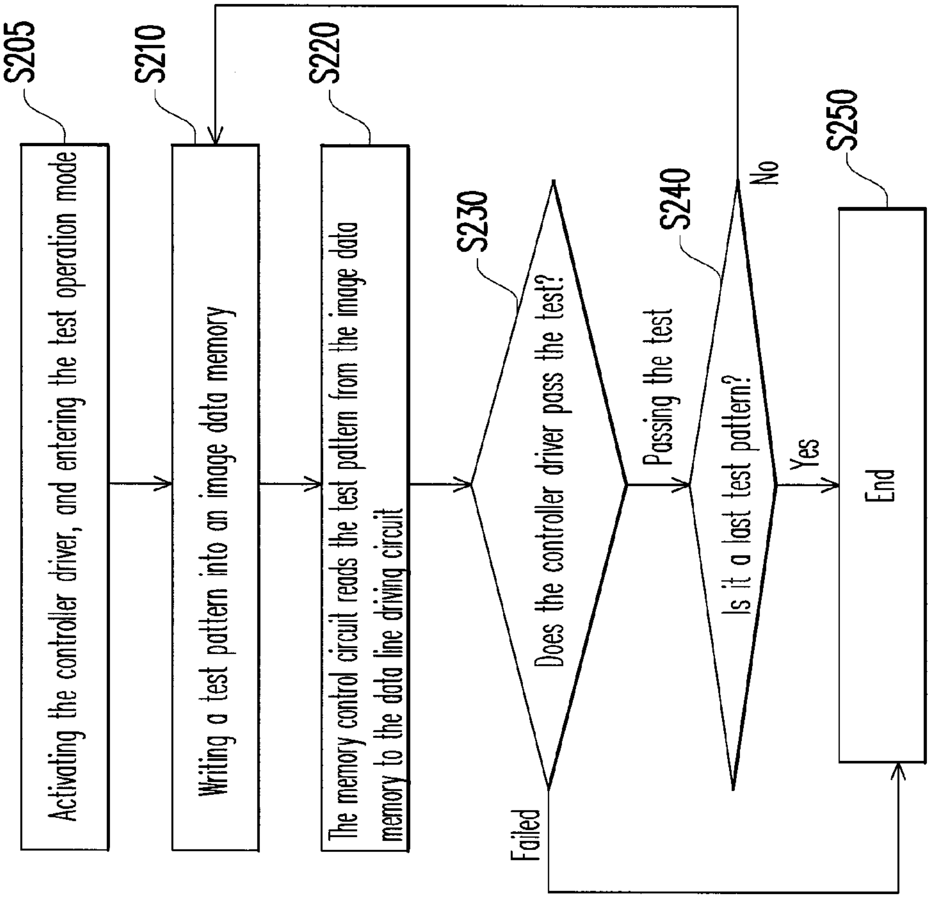
FIG. 2B(RELATED ART)
FIG. 2B is a test flow of the controller driver of FIG. 1 in a test operation mode.
Figure 3:
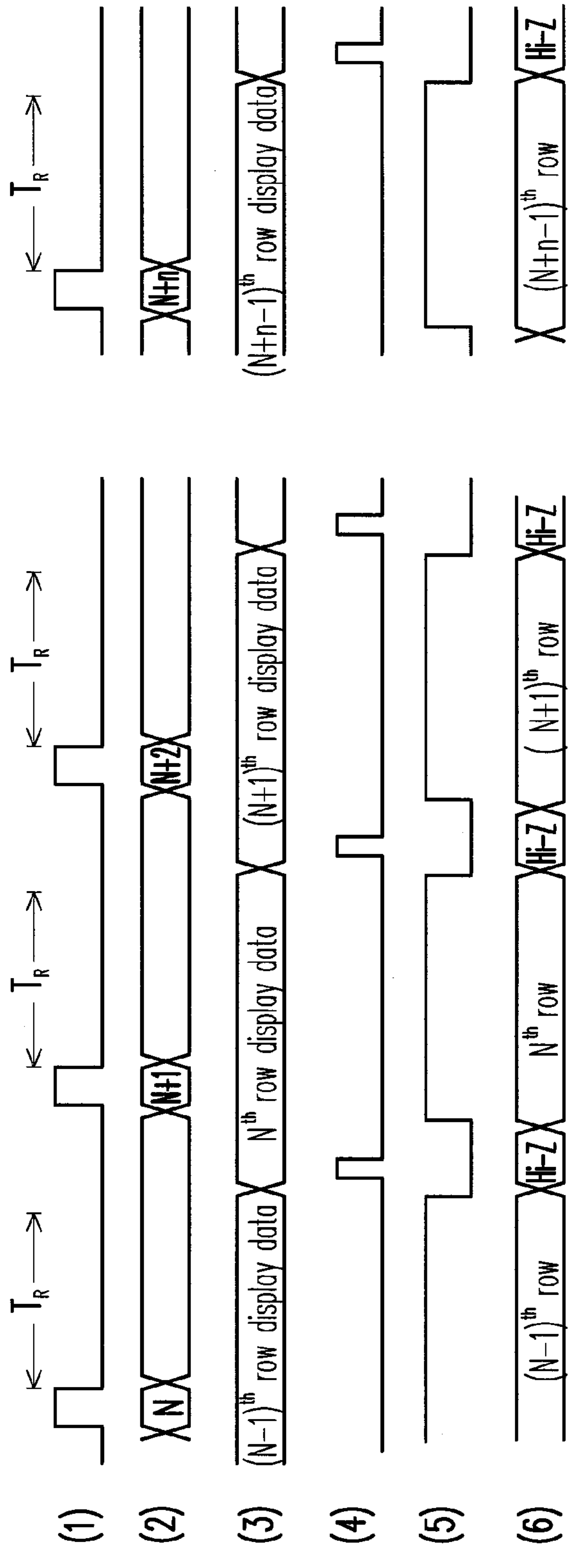
FIG. 3 (RELATED ART)
FIG. 3 is a timing diagram of the controller driver of FIG. 1 in the test operation mode.

When the controller driver 400 is operated in a normal operation mode, the processor 410 transmits image data and a plurality of control signals to the memory control circuit 422, the timing control circuit 424 and the data selection unit 428 through the system interface circuit 420. The memory control circuit 422 temporarily stores the image data provided by the external processor 410 in the image data memory 426. The timing control circuit 424 performs various control operations according to the control signals. For example, the timing control circuit 424 controls the memory control circuit 422 to read the image data from the image data memory 426, and outputs a latch signal to latch the image data to data output terminals of the memory control circuit 422, so as to transmit the image data to the data selection unit 428. In the normal operation mode, the data selection unit 428 is in a non-enable state in response to a control signal TE of the external processor 410, and the data selection unit 428 directly transmits the image data outputted by the memory control circuit 422 to the data line driving circuit 432. The timing control circuit 424 further outputs control signals to control the data line driving circuit 432 and the scan line driving circuit 434. Under the control of the timing control circuit 424, and in collaboration with the operation of the scan line driving circuit 434, the data line driving circuit 432 converts the image data into grayscale voltages, and transmits the grayscale voltages to pixels in the display panel 440 to display a corresponding image. Operation details that the memory control circuit 422 reads the image data from the image data memory 426 and operation details that the timing control circuit 424, the data line driving circuit 432 and the scan line driving circuit 434 drive the display panel 440 can refer to related descriptions of the embodiment of FIG. 1.

When the controller driver 400 is operated in a test operation mode, a test flow of the controller driver 400 is performed. In the test operation mode, the processor 410 can be a test platform, and an output terminal of the controller driver 400 is electrically connected to a measurement equipment of the test platform. Now, the data selection unit 428 is in an enable state in response to the control signal TE of the processor 410, so that the data selection unit 428 selects to receive a test command and/or a test pattern TP from the external processor 410 (for example, the test platform), and transmits the corresponding test pattern TP to the data line driving circuit 432 for testing. The external processor 410 can adjust the test pattern TP according to different test designs to satisfy customisation requirements.

Figure 5:
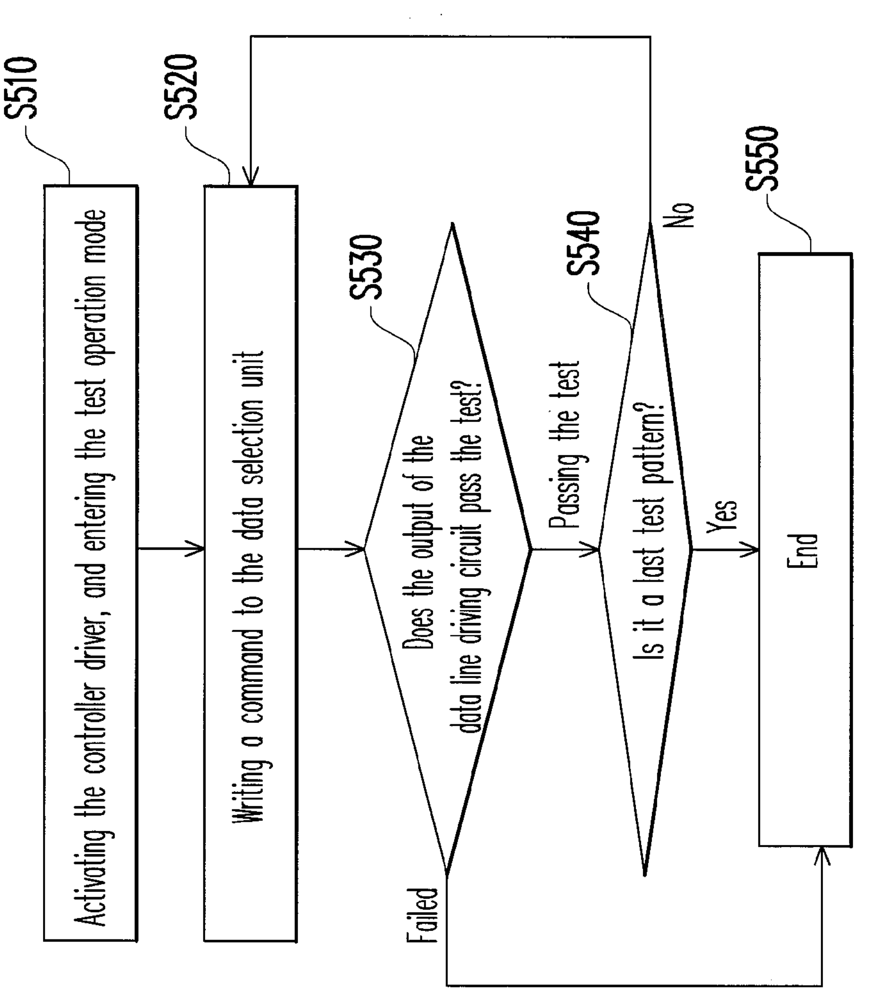
FIG. 5 is a test flow of the controller driver of FIG. 4 according to an embodiment of the invention.

A test flow of the controller driver 400 is as that shown in FIG. 5. First, in step S510, the external processor 410 (for example, the test platform) activates the controller driver 400, and controls the controller driver 400 to enter the test operation mode through the control signal TE, so as to activate a transmission channel of the test pattern. Then, in step S520, the processor 410 writes the command and/or the test pattern TP into the data selection unit 428. For example, the processor 410 can provide the test pattern TP to the data line driving circuit 432 through the data selection unit 428. In other embodiments, the processor 410 can transmit the command to the data selection unit 428, and the data selection unit 428 generates the corresponding test pattern TP to the data line driving circuit 432 according to the command. In the present embodiment, when the controller driver 400 is operated in the test operation mode, the data selection unit 428 decodes the command provided by the external processor 410, and selectively provides the test pattern TP to a part of or all of channels of the data line driving circuit 432 to serve as display data according to a decoding result. For example, the processor 410 can respectively output a command and a test pattern TP of "00" and "grayscale 0", and after the data selection unit 428 decodes the command "00", it provides the test pattern TP of "grayscale 0" to all of the channels of the data line driving circuit 432. Therefore, ideally, all of the output terminals of the data line driving circuit 432 should output a driving voltage of "grayscale 0". For another example, the processor 410 can respectively output a command and a test pattern TP of "01" and "grayscale 255", and after the data selection unit 428 decodes the command "01", it provides the display data of "grayscale 255" to odd channels of the data line driving circuit 432, and provides the display data of "grayscale 0" to even channels of the data line driving circuit 432.

Then, in step S530, it is measured whether the output of the data line driving circuit 432 passes the test. If not, in step S550, the test flow is ended, though if yes, a step S540 is executed, by which the processor 410 determines whether the current test pattern is a last test pattern. If the current test pattern is the last test pattern, the step S550 is executed to end the test flow. If the test pattern is not the last test pattern, the step S520 is returned, and the processor 410 transmits a next command and/or a test pattern TP to the controller driver 400 for testing.

As described above, in the test operation mode, the data selection unit 428 transmits the corresponding test pattern to the data line driving circuit 432 according to the command of the processor 410 without accessing the image data memory 426 through the memory control circuit 422. Therefore, according to the above test flow, frequent write and read operations of the image data memory 426 are unnecessary, so that a test speed of the controller driver 400 can be accelerated.

Figure 6:
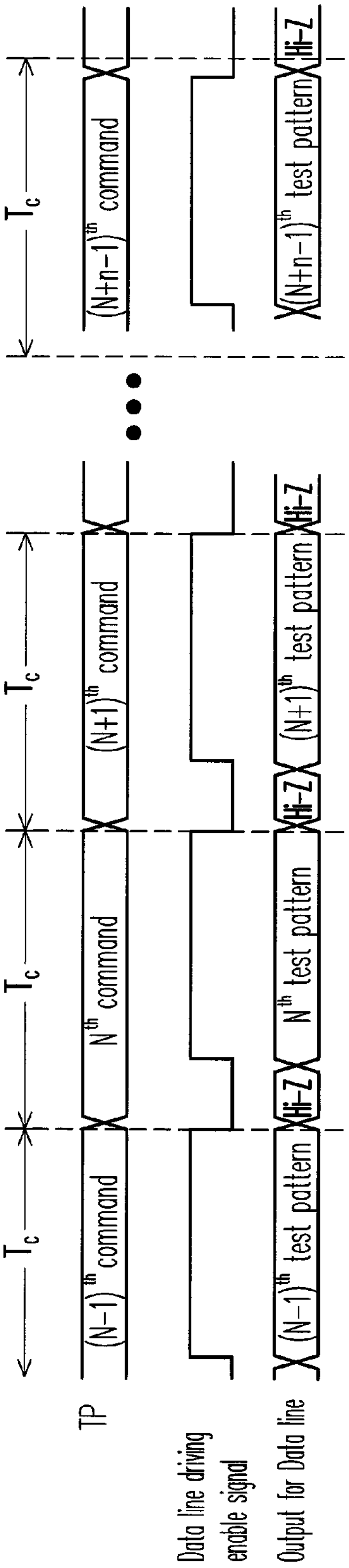
FIG. 6 is a signal timing diagram of the controller driver of FIG. 4 in the test operation mode according to an embodiment of the invention.

A signal timing diagram of the controller driver 400 in the test operation mode is as that shown in FIG. 6. The timing diagram of FIG. 6 includes (1) the commands and/or the test patterns TP of the data selection unit 428; (2) data line driving enable signals of the data line driving circuit 432; and (3) data line outputs of the data line driving circuit 432.

As shown in FIG. 6, within a time section $T_C$, the data selection unit 428 receives an $(N-1)^{th}$ command and/or test pattern TP from the external processor 410 and transmits the corresponding $(N-1)^{th}$ test pattern to the data line driving circuit 432. Therefore, the data line driving circuit 432 can obtain the $(N-1)^{th}$ test pattern, and perform the test in allusion to the $(N-1)^{th}$ test pattern. In a next time section $T_C$, the data selection unit 428 receives an $N^{th}$ command and/or test pattern TP from the external processor 410 and transmits a corresponding $N^{th}$ test pattern to the data line driving circuit 432. In case that the data line driving enable signal outputs to the data line driving circuit 432 by the timing control circuit 424 is in a logic high state, the data line driving circuit 432 outputs the $N^{th}$ test pattern. Now, the test platform can measure the output of the data line driving circuit 432 to test the $N^{th}$ test pattern. Deduced by analogy, the processor 410 can sequentially send $(N+1)^{th}$ to $(N+n-1)^{th}$ commands and/or test patterns TP, and the controller driver 400 can sequentially perform the display data test in allusion to the $(N+1)^{th}$ to $(N+n-1)^{th}$ test patterns, so as to complete display tests of different test patterns.

FIG. 7 is a partial circuit block diagram of a controller driver according to another embodiment of the invention. The embodiment of FIG. 7 can refer to the related description of the embodiment of FIG. 4. In the embodiment of FIG. 7, each data output terminal of the memory control circuit 422 is configured with a latch unit, for example, latch units $\mathbf{710}_0$, $\mathbf{710}_1$, $\mathbf{710}_2$, . . . , $\mathbf{710}_{N-1}$. Each channel of the data line driving circuit 432 is configured with an output stage circuit, for example, output stage circuits $\mathbf{730}_0$, $\mathbf{730}_1$, $\mathbf{730}_2$, . . . , $\mathbf{730}_{N-1}$. The grayscale voltage generating circuit 436 is used to provide a plurality of grayscale voltage signals to each of the output stage circuits $\mathbf{730}_0$-$\mathbf{730}_{N-1}$ of the data line driving circuit 432. Theses output stage circuits $\mathbf{730}_0$-$\mathbf{730}_{N-1}$ can select to output a corresponding grayscale voltage from a plurality of the grayscale voltages according to digital data.

The data selection unit 428 is disposed between the memory control circuit 422 and the data line driving circuit 432. Each channel in the data selection unit 428 is configured with a logic unit, for example, logic units $\mathbf{720}_0$, $\mathbf{720}_1$, $\mathbf{720}_2$, . . . , $\mathbf{720}_{N-1}$. A first input terminal of each of the logic units $\mathbf{720}_0$, $\mathbf{720}_1$, $\mathbf{720}_2$, . . . , $\mathbf{720}_{N-1}$ is connected to the output terminal of one of the latch units $\mathbf{710}_0$, $\mathbf{710}_1$, $\mathbf{710}_2$, . . . , $\mathbf{710}_{N-1}$, and a second input terminal of each of the logic units $\mathbf{720}_0$, $\mathbf{720}_1$, $\mathbf{720}_2$, . . . , $\mathbf{720}_{N-1}$ is connected to the external processor 410 through the system interface circuit 420. An output terminal of each of the logic units $\mathbf{720}_0$, $\mathbf{720}_1$, $\mathbf{720}_2$, . . . , $\mathbf{720}_{N-1}$ of the data selection unit 428 is connected to one of the output stage circuits $\mathbf{730}_0$, $\mathbf{730}_1$, $\mathbf{730}_2$, . . . , $\mathbf{730}_{N-1}$ of the data line driving circuit 432.

When the controller driver 400 is operated in the normal operation mode, the data selection unit 428 is in the non-enable state. Namely, each of the logic units $\mathbf{720}_0$, $\mathbf{720}_1$, $\mathbf{720}_2$, . . . , $\mathbf{720}_{N-1}$ of the data selection unit 428 directly transmits the display data outputted by the latch units $\mathbf{710}_0$, $\mathbf{710}_1$, $\mathbf{710}_2$, . . . , $\mathbf{710}_{N-1}$ to each of the output stage circuits $\mathbf{730}_0$, $\mathbf{730}_1$, $\mathbf{730}_2$, . . . , $\mathbf{730}_{N-1}$ of the data line driving circuit 432.

When the controller driver 400 is operated in the test operation mode, the data selection unit 428 is in the enable state. Namely, each of the logic units $\mathbf{720}_0$, $\mathbf{720}_1$, $\mathbf{720}_2$, . . . , $\mathbf{720}_{N-1}$ of the data selection unit 428 receives the command and at least one test pattern TP from the processor 410, and transmits the test pattern to each of the output stage circuits $\mathbf{730}_0$, $\mathbf{730}_1$, $\mathbf{730}_2$, . . . , $\mathbf{730}_{N-1}$ of the data line driving circuit 432, to as to test the data line driving circuit 432.

In the test flow of the controller driver 400, the command and the test pattern TP can be directly received from the processor 410, and the test pattern is transmitted to the data line driving circuit 432 for testing. The test pattern can be adjusted according to different test designs to satisfy customisation requirements.

Figure 8A:
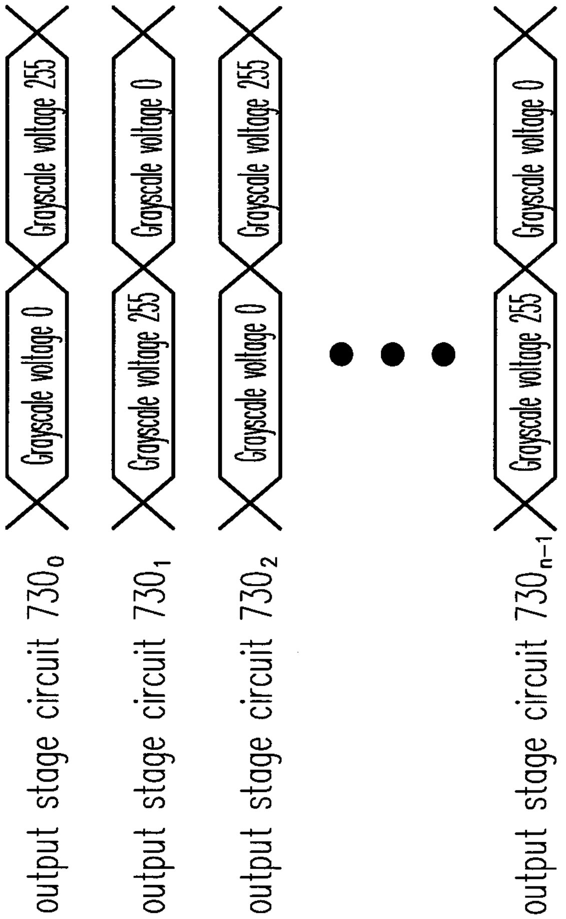
FIG. 8A and FIG. 8B are signal timing diagrams of test patterns of the controller driver of FIG. 4 in the test operation mode according to an embodiment of the invention.

For example, in an embodiment, the processor 410 can output a command and a test pattern TP of "01" and "grayscale 255" to the logic units $\mathbf{720}_0$-$\mathbf{720}_{N-1}$. The logic units $\mathbf{720}_0$-$\mathbf{720}_{N-1}$ decode the command "01", and respectively provide the display data of "grayscale 255" to the odd output stage circuits (for example, $\mathbf{730}_1$) of the data line driving circuit 432, and provide the display data of "grayscale 0" to the even output stage circuits (for example, $\mathbf{730}_0$ and $\mathbf{730}_2$) of the data line driving circuit 432. The processor 410 can output a command and a test pattern TP of "10" and "grayscale 255" to the logic units $\mathbf{720}_0$-$\mathbf{720}_{N-1}$. The logic units $\mathbf{720}_0$-$\mathbf{720}_{N-1}$ decode the command "10", and respectively provide the display data of "grayscale 255" to the even output stage circuits (for example, $\mathbf{730}_0$ and $\mathbf{730}_2$) of the data line driving circuit 432, and provide the display data of "grayscale 0" to the odd output stage circuits (for example, $\mathbf{730}_1$) of the data line driving circuit 432. The test patterns can be as that shown in FIG. 8A, and the logic units $\mathbf{720}_0$, $\mathbf{720}_1$, $\mathbf{720}_2$, . . . , $\mathbf{720}_{N-1}$ of the data selection unit 428 provide different grayscale voltages to the adjacent data channels of the data line driving circuit 432 to test whether the adjacent data channels have a short circuit phenomenon.

For example, regarding the display data of 8 bits, the grayscale voltage level thereof is 0-255. Therefore, when the logic unit $\mathbf{720}_0$ provides test data representing a grayscale voltage level of 0 to the output stage circuit $\mathbf{730}_0$, the logic unit $\mathbf{720}_1$ provides test data representing a grayscale voltage level of 255 to the output stage circuit $\mathbf{730}_1$, the logic unit $\mathbf{720}_2$ provides test data representing the grayscale voltage level of 0 to the output stage circuit $\mathbf{730}_2$, the logic unit $\mathbf{720}_3$ provides test data representing the grayscale voltage level of 255 to the output stage circuit $\mathbf{730}_3$, and deduced by analogy. Therefore, in case that the data line driving circuit 432 is in a good state, the grayscale voltage level of 0 can be measured at the output terminals of the output stage circuits $\mathbf{730}_0$ and $\mathbf{730}_2$, and the grayscale voltage level of 255 can be measured at the output terminal of the output stage circuit $\mathbf{730}_1$. In another period, conversely, when the logic unit $\mathbf{720}_0$ provides test data representing the grayscale voltage level of 255 to the output stage circuit $\mathbf{730}_0$, the logic unit $\mathbf{720}_1$ provides test data representing the grayscale voltage level of 0 to the output stage circuit $\mathbf{730}_1$, the logic unit $\mathbf{720}_2$ provides test data representing the grayscale voltage level of 255 to the output stage circuit $\mathbf{730}_2$, and deduced by analogy.

Figure 8B:
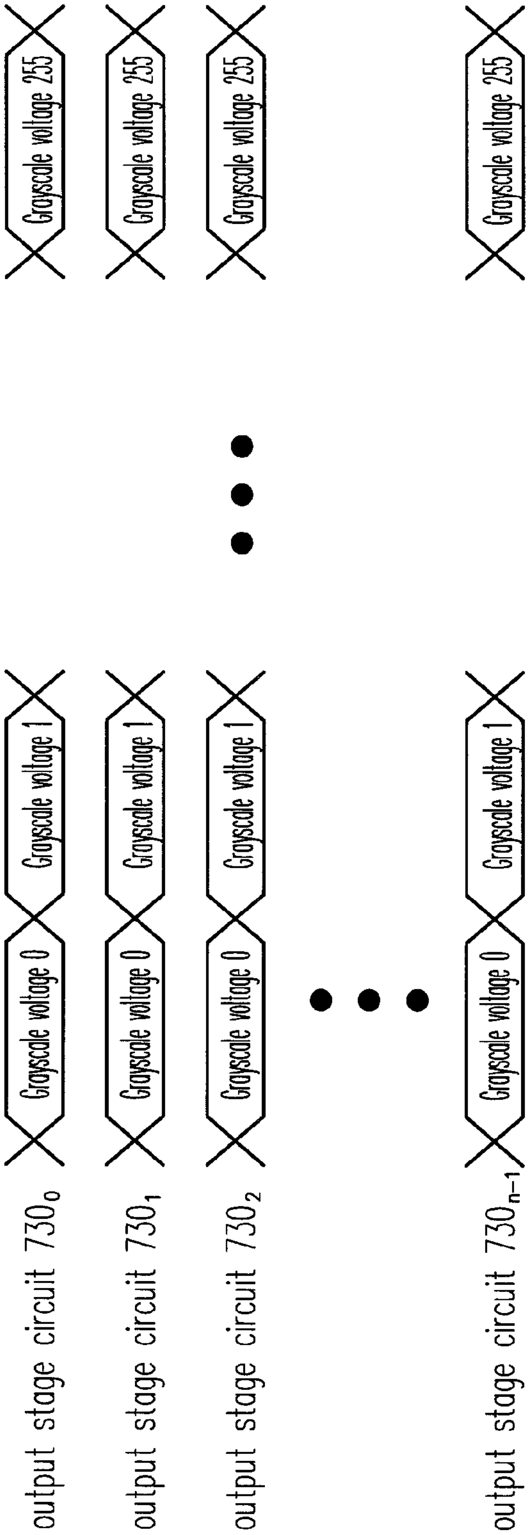

For example, in another embodiment, the processor 410 can output a command and a test pattern TP of "00" and "grayscale 0" to the logic units $\mathbf{720}_0$-$\mathbf{720}_{N-1}$. The logic units $\mathbf{720}_0$-$\mathbf{720}_{N-1}$ decode the command "00", and respectively provide the test data of "grayscale 0" to the output stage circuits $\mathbf{730}_0$-$\mathbf{730}_{N-1}$. The test patterns are as that shown in FIG. 8B, and in the same period, all of the output stage circuits $\mathbf{730}_0$-$\mathbf{730}_{N-1}$ of the data line driving circuit 432 perform the same grayscale voltage test. Therefore, the output terminals of all of the output stage circuits $\mathbf{730}_0$-$\mathbf{730}_{N-1}$ ideally output the driving voltage of "grayscale 0". In a next period, the processor 410 can output a command and a test pattern TP of "00" and "grayscale 1" to the logic units $\mathbf{720}_0$-$\mathbf{720}_{N-1}$. The logic units $\mathbf{720}_0$-$\mathbf{720}_{N-1}$ decode the command "00", and respectively provide the test data of "grayscale 1" to the output stage circuits $\mathbf{730}_0$-$\mathbf{730}_{N-1}$. Therefore, the output terminals of all of the output stage circuits $\mathbf{730}_0$-$\mathbf{730}_{N-1}$ ideally output the driving voltage of "grayscale 1". Deduced by analogy, in the 0-255 periods of FIG. 8B, the logic units $\mathbf{720}_0$-$\mathbf{720}_{N-1}$ sequentially output the grayscale data of 0-255 to the output stage circuits $\mathbf{730}_0$-$\mathbf{730}_{N-1}$, and the output stage circuits $\mathbf{730}_0$-$\mathbf{730}_{N-1}$ sequentially output the grayscale voltages of 0-255. Therefore, the test patterns shown in FIG. 8B can respectively test a variation degree of each of the output stage circuits $\mathbf{730}_0$, $\mathbf{730}_1$, $\mathbf{730}_2$, . . . , $\mathbf{730}_{N-1}$ (i.e. each channel of the controller driver 400), and can test digital analog conversion performance of the controller driver 400 and driving capability for each grayscale.

According to the above test structure and test flow, the test time for the data line driving circuit can be effectively reduced, and test efficiency thereof is improved.

In summary, the data selection unit 428 of the invention can output the image data provided by the image data memory 426 to serve as the display data. Alternatively, the data selection unit 428 can generate the display data according to the command and/or the test pattern TP provided by the external processor 410. Therefore, in the test operation mode, the controller driver 400 is unnecessary to write the test pattern into the image data memory 426, and unnecessary to read the test pattern from the image data memory 426, so that the test efficiency of the controller driver 400 is ameliorated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A controller driver, comprising:

a timing control circuit, outputting a plurality of control signals;

a data memory unit, storing image data;

a data selection unit, coupled to the data memory unit, and selecting to output the image data provided by the data memory unit as display data, or generating the display data to a data line driving circuit without passing through the data memory unit and the timing control circuit according to a command or a test pattern provided from an external processor; and the data line driving circuit, coupled to the timing control circuit and the data selection unit, receiving the display data from the data selection unit, and outputting a grayscale voltage according to the control signals.

2. The controller driver as claimed in claim 1, wherein the data selection unit directly transmits the image data outputted by the data memory unit to the data line driving circuit to serve as the display data when the controller driver is operated in a normal operation mode, and the data selection unit generates the display data to the data line driving circuit according to the command or the test pattern provided by the external processor when the controller driver is operated in a test operation mode.

3. The controller driver as claimed in claim 2, wherein when the controller driver is operated in the test operation mode, the data selection unit provides the test pattern outputted by the external processor to the data line driving circuit to serve as the display data.

4. The controller driver as claimed in claim 2, wherein when the controller driver is operated in the test operation mode, the data selection unit generates a corresponding test pattern to the data line driving circuit to serve as the display data according to the command outputted by the external processor.

5. The controller driver as claimed in claim 2, wherein when the controller driver is operated in the test operation mode, the data selection unit decodes the command and selectively provides the test pattern to a part of or all of channels of the data line driving circuit to serve as the display data according to a decoding result.

6. The controller driver as claimed in claim 1, wherein the data selection unit comprises:

a plurality of logic units, each having an output terminal connected to one of a plurality of output stage circuits of the data line driving circuit, wherein the logic units select to output the image data provided by the data memory unit to the output stage circuits, or generate the display data to the output stage circuits according to the command or the test pattern provided by the external processor.

7. The controller driver as claimed in claim 1, further comprising:

a system interface circuit, coupled to the data memory unit, the data selection unit and the timing control circuit, wherein the external processor transmits the command or the test pattern to the data selection unit through the system interface circuit.

8. The controller driver as claimed in claim 1, wherein the data memory unit comprises:

an image data memory, storing the image data; and a memory control circuit, coupled between the image data memory and the data selection unit.

* * * * *